(12) United States Patent
Anderson et al.

(10) Patent No.: US 6,338,611 B1
(45) Date of Patent: Jan. 15, 2002

(54) CONFORMING PLATFORM FAN BLADE

(75) Inventors: Bernard Joseph Anderson, Danvers; Jeffrey Howard Nussbaum, Wilmington, both of MA (US); Juan Mario Gomez, Loveland, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/607,491

(22) Filed: Jun. 30, 2000

(51) Int. Cl.[7] .............................. F03B 3/12; F04D 29/38
(52) U.S. Cl. ................ 416/193 A; 416/243; 416/204 A
(58) Field of Search ........................... 416/193 A, 243, 416/204 A, 248

(56) References Cited

U.S. PATENT DOCUMENTS 4,541,778 A * 9/1985 Adams .................... 416/193 A
5,853,286 A * 12/1998 Bussonnet et al. ...... 416/193 A

OTHER PUBLICATIONS

GE Aircraft Engines, "CF6–80E Fan Blade," commercial use in the United States for more than one year, single sheet drawing excerpt.

* cited by examiner

*Primary Examiner*—Edward K. Look
*Assistant Examiner*—Kimya McCoy
(74) *Attorney, Agent, or Firm*—Andrew C. Hess; Nathan D. Herkamp

(57) ABSTRACT

A fan blade includes an airfoil having a root and an integral platform. The platform includes forward and aft ends and arcuate first and second sides therebetween. The airfoil root is laterally offset closer to the platform first side than the second side. Impact loads with a trailing blade during a blade-out failure are accordingly distributed for reducing peak loading in the trailing blade and damage thereto.

20 Claims, 4 Drawing Sheets

CONFORMING PLATFORM FAN BLADE

BACKGROUND OF THE INVENTION

The present invention relates generally to gas turbine engines, and, more specifically, to fans therein.

Passenger carrying aircraft are typically powered by turbofan gas turbine engines. A row of large fan blades is supported by a rotor disk inside an annular nacelle. The engine powers the fan for producing thrust for powering the aircraft in flight.

The fan blades first receive ambient air and are subject to foreign object damage, such as that caused by bird ingestion during flight. The fan blades are relatively large and generate substantial centrifugal force as they rotate during operation. Failure of even one fan blade which liberates the blade from its supporting disk ejects that blade radially outwardly from the engine.

Accordingly, the fan casing surrounding the row of fan blades typically includes a blade containment shield which absorbs the energy of the ejected blade, and contains the blade from being otherwise liberated from the engine.

In such a blade-out mode of failure, the blade is ejected practically instantaneously, yet for a brief instant is within the rotary travel direction of the following or trailing blades in the blade row. The ejected blade will then impact the trailing blade causing damage thereto.

Liberation of the ejected blade creates rotor imbalance and corresponding imbalance loads which must be suitably reacted through supporting structure. Additional damage to one or more of the trailing blades can also affect rotor imbalance, and lead to considerable secondary damage.

Accordingly, it is desired to provide a gas turbine engine fan having reduced damage due to a blade-out failure mode.

BRIEF SUMMARY OF THE INVENTION

A fan blade includes an airfoil having a root and an integral platform. The platform includes forward and aft ends and arcuate first and second sides therebetween. The airfoil root is laterally offset closer to the platform first side than the second side. Impact loads with a trailing blade during a blade-out failure are accordingly distributed for reducing peak loading in the trailing blade and damage thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
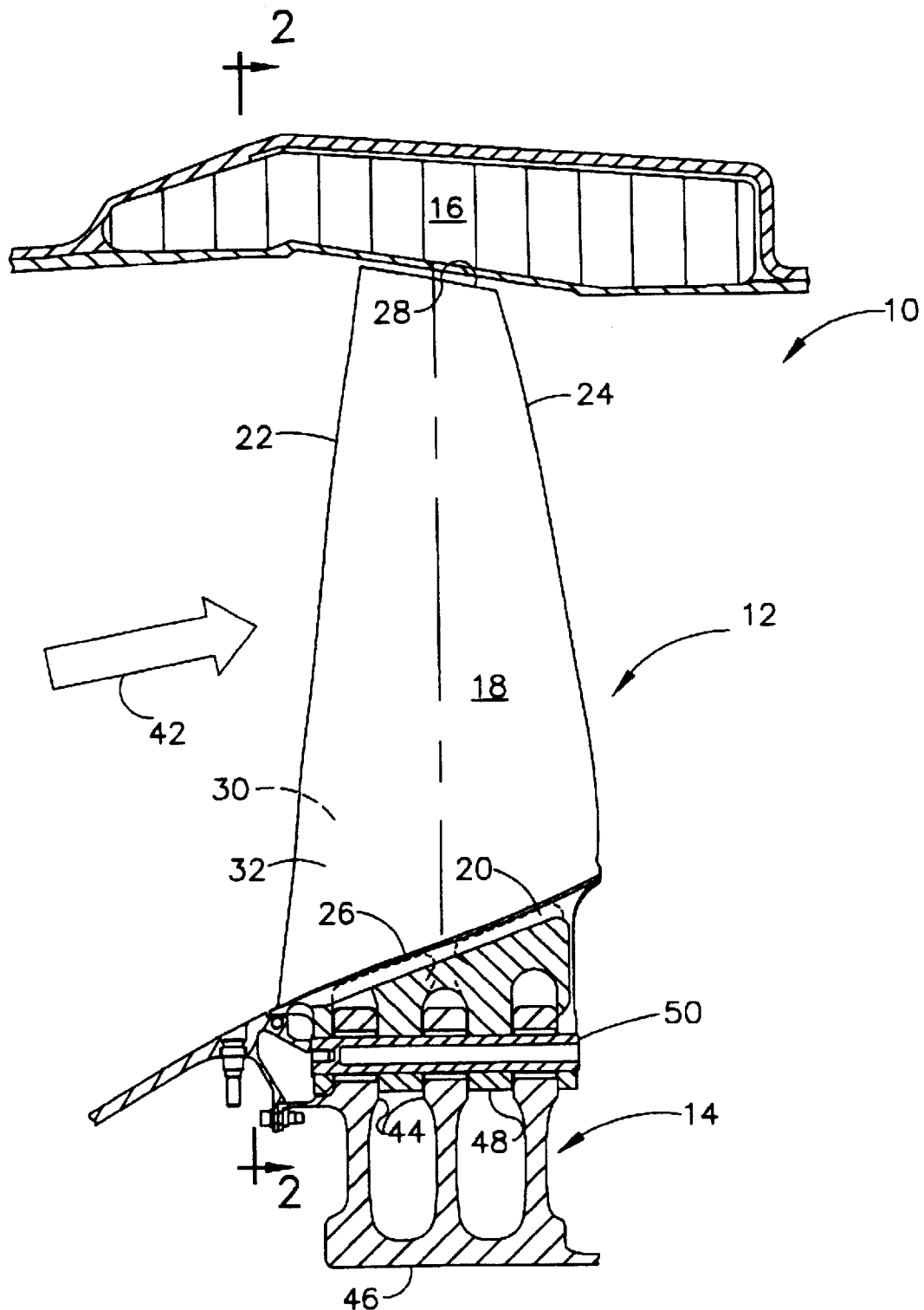
FIG. 1 is an axial sectional view through a fan in a gas turbine engine in accordance with an exemplary embodiment of the present invention.

Illustrated in FIG. 1 is a portion of fan 10 of a turbofan gas turbine engine configured for powering an aircraft in flight.

The fan 10 is axisymmetrical about a longitudinal or axial centerline axis and includes a plurality of fan rotor blades 12 extending radially outwardly from a supporting rotor disk 14. The fan is disposed inside an annular nacelle in which an annular fan containment shield 16 is disposed for absorbing energy and containing the fan blades 12 in the event of a blade-out mode of failure in which a fan blade is liberated from its supporting disk.

Figure 2:
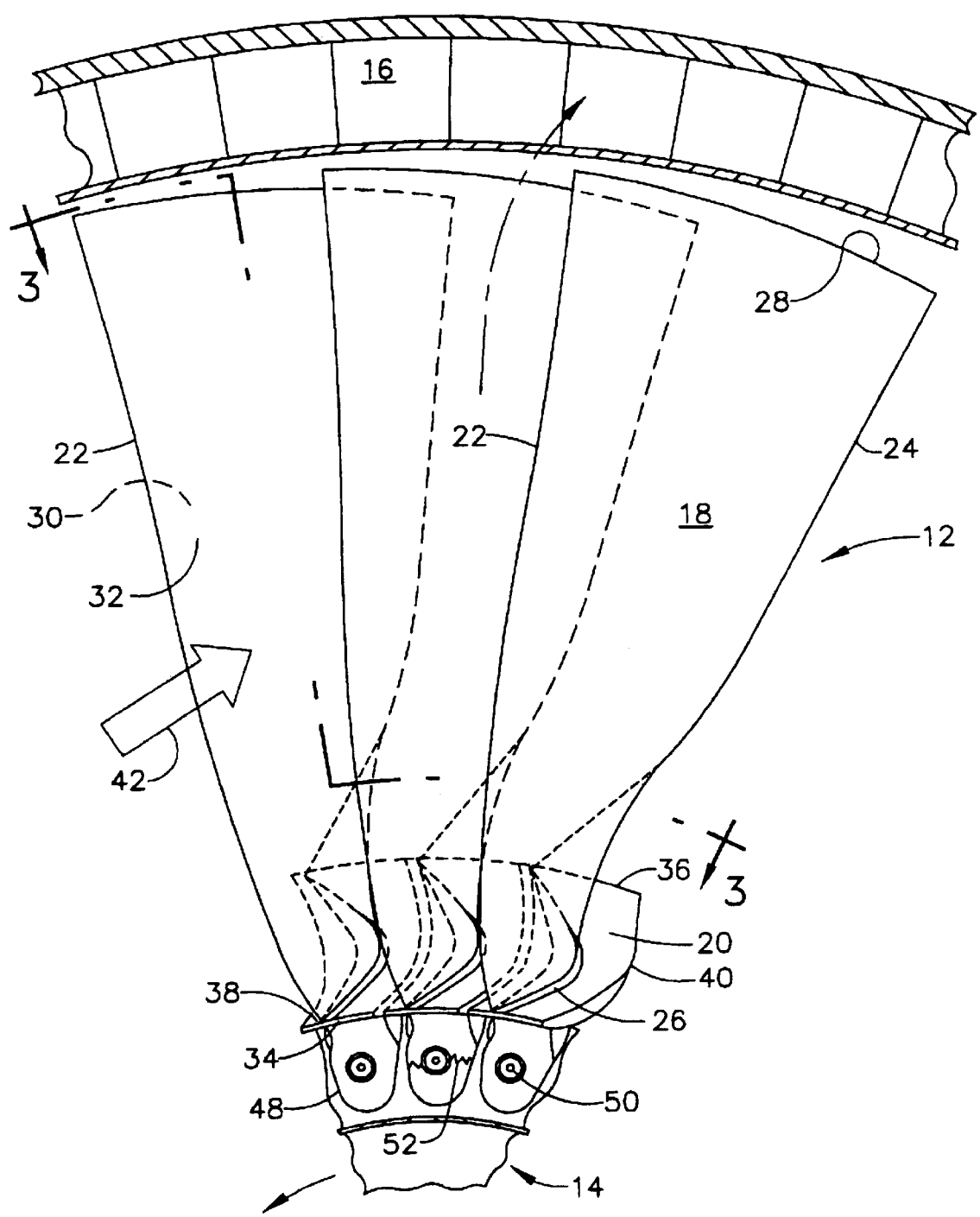
FIG. 2 is a front-facing-aft radial view of a portion of the fan illustrated in FIG. 1 and taken along line 2—2.

Each of the blades 12 illustrated in FIGS. 1 and 2 includes an airfoil 18 extending radially outwardly from an integral platform 20 in a unitary or one-piece construction.

Figure 3:
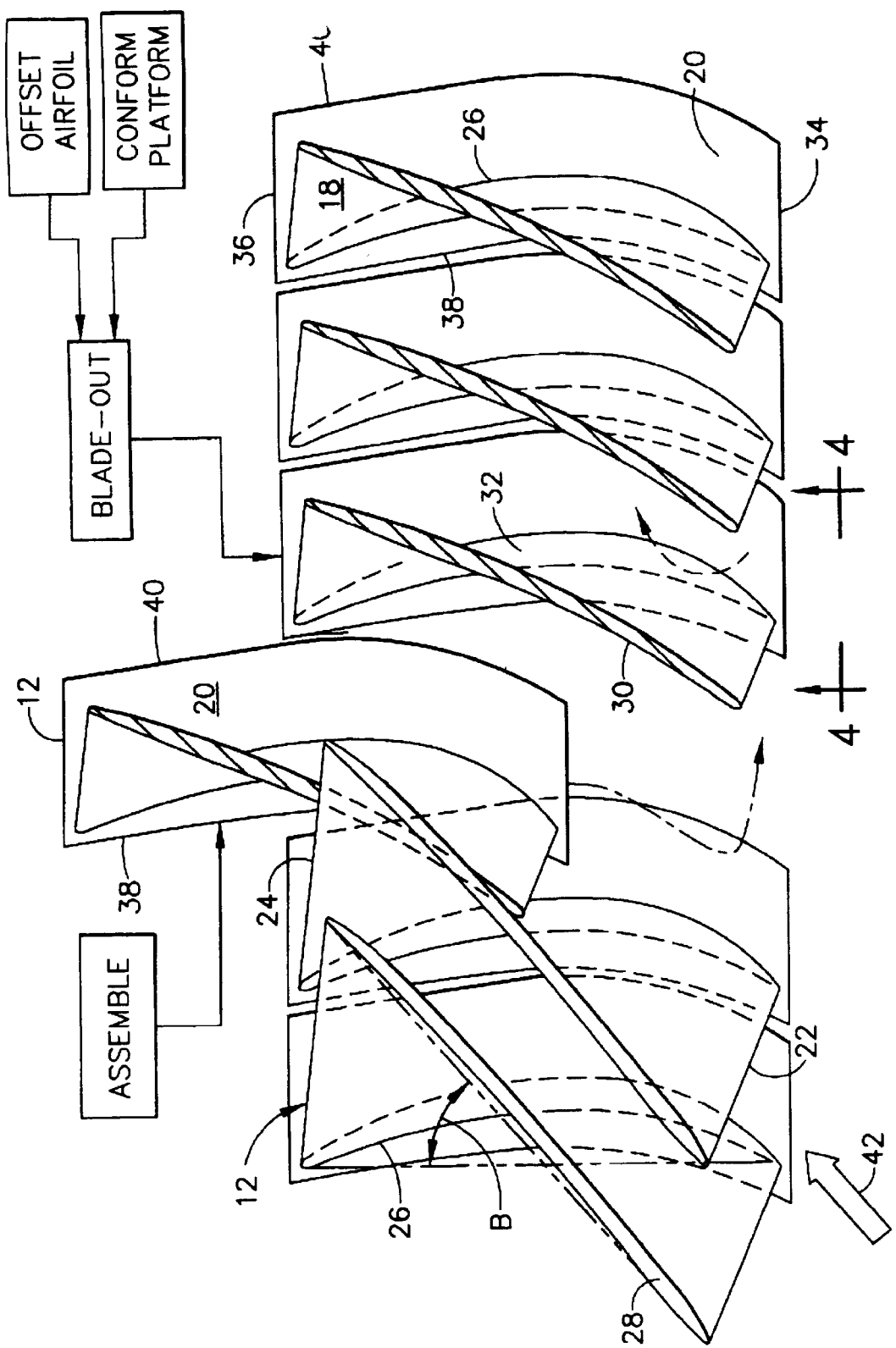
FIG. 3 is a top, partly sectional view, of a portion of the fan illustrated in FIG. 2 and taken along line 3—3.

As shown in FIGS. 2 and 3, each airfoil 18 includes axially opposite leading and trailing edges 22,24 extending radially from a root 26 to a tip 28 at opposite ends of the span thereof. The airfoil also includes a first, generally concave pressure side 30, and a circumferentially opposite second, generally convex suction side 32 extending between the leading and trailing edges and root and tip.

As best shown in FIG. 3, each platform is integrally joined to the airfoil at its root 26, and each platform has axially forward and aft edges or ends 34,36 extending between circumferentially opposite first and second sides or edges 38,40 which are generally arcuate in accordance with the present invention.

Also in accordance with the present invention, the airfoil root 26 is circumferentially or laterally offset closer to the platform first side 38 than to the platform second side 40.

As initially shown in FIG. 2, the disk 14 is rotated counterclockwise for channeling air 42 between the adjacent airfoils 18. As shown in FIG. 1, the air 42 flows axially aft from the leading edge 22 to the trailing edge 24 and is pressurized by the aerodynamic profile of the airfoil due to the curvature or camber of the airfoil sides 30,32.

As shown in FIG. 3, the air 42 flows axially aft between adjacent airfoils 18 as the airfoils rotate counterclockwise on the supporting disk, which is from right-to-left in FIG. 3. Accordingly, the airfoil pressure sides 30 lead the corresponding suction sides 32 in the circumferential direction as the blades rotate with the disk. Correspondingly, the platform first sides 38 define leading sides which precede the platform second sides 40 which define trailing sides relative to the rotational direction of the blades and disk.

FIG. 3 illustrates schematically an exemplary blade-out occurrence in which one of the fan blades is liberated from the supporting disk and is ejected radially outwardly by centrifugal force. This is illustrated in more detail in FIG. 4 wherein the centrifugal force is designated F and ejects the fan blade radially outwardly during rotation.

Although the blade is liberated from the supporting disk, it is within the circumferential rotary path of the trailing blades until it is completely ejected from the fan and typically contained within the shield 16 illustrated in FIG. 1. However, during the interval of blade liberation as illustrated firstly in FIG. 4, the next-adjacent trailing blade impacts the liberated blade as illustrated in more detail in FIG. 5.

Referring again to FIG. 4, by laterally offsetting the airfoils 18 toward the leading sides 38 of the platforms, the corresponding trailing sides 40 of the platforms are more closely adjacent to the pressure sides 30 of the trailing blades. In the event of a blade-out failure, the trailing side 40 of the liberated platform will more quickly impact the pressure side 30 of the trailing airfoil since it is relatively close thereto.

Figure 4:
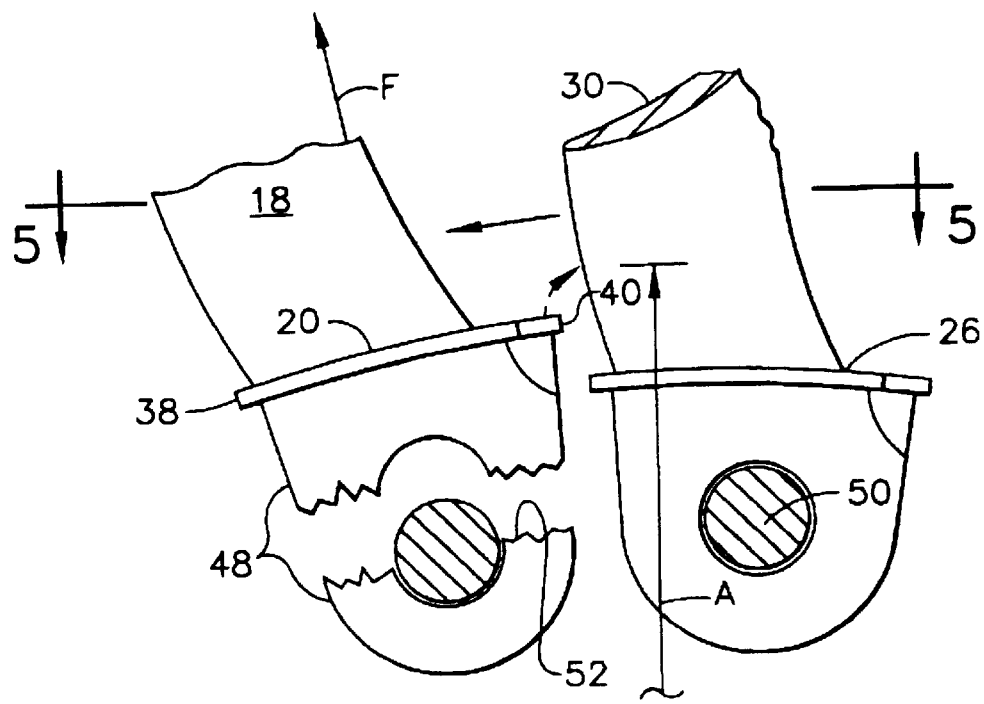
FIG. 4 is a front elevational view through a portion of a blade being ejected in FIG. 3 and taken along line 4—4.

This impact will correspondingly occur at a relatively small or low radius A, as illustrated in FIG. 4 and measured from the axial centerline of the fan, which corresponds with the lower end of the airfoil span closely adjacent to the platform. At this airfoil location, the airfoil cross section is relatively thick and substantially stronger than it is at outboard locations along the span where the airfoil tapers with reduced thickness.

In this way, the impact loads are first carried by the stronger lower portion of the airfoil span for reducing initial impact damage thereto during blade-out.

Figure 5:
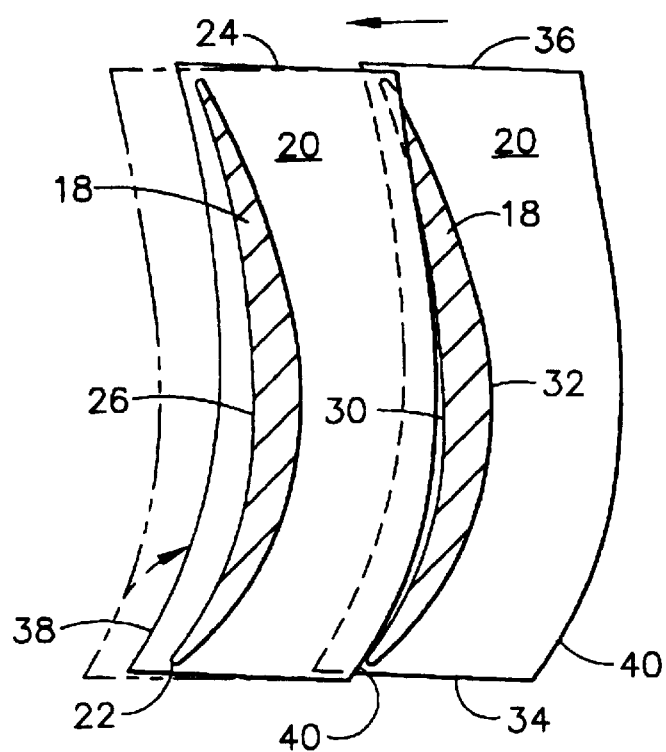
FIG. 5 is a top sectional view through the ejected blade and adjoining trailing blade illustrated in FIG. 4 and taken along line 5—5.

As shown in FIG. 5, the platform trailing side 40 preferably conforms in axial arcuate profile with the airfoil pressure side 30. In this way, the platform trailing side 40 of each blade conforms in profile with the airfoil pressure side 30 of the next adjoining trailing blade so that in the event of a blade-out failure, the corresponding impact site is relatively long along the chordal direction of the airfoil for spreading the impact loads and thereby lessening impact damage.

Accordingly, a substantial reduction of damage in the fan may be obtained during the blade-out failure in which one of the fan blades in the row is ejected radially outwardly from its supporting disk. The airfoils 18 of the individual blades 12 are offset circumferentially in the direction of rotation and away from the respective trailing sides 40 of the integral platforms 20. The platform trailing sides 40 are additionally conformed in profile with respective pressure sides 30 of the circumferentially trailing airfoils for axially spreading contact loads therebetween during ejection of any one of the blades under centrifugal force.

As shown in FIGS. 4 and 5, the platform trailing sides 40 preferably conform in profile with the airfoil pressure sides 30 radially between the corresponding roots 26 of the airfoils and the midspan thereof. Preferably, the conforming profile occurs nearer the airfoil roots, where the airfoil is thickest, than the midspans.

As shown in FIG. 5, the airfoil pressure side 30 is generally concave between the leading and trailing edges 22,24, and the platform trailing sides 40 are preferably complementary convex therewith from blade-to-blade. Preferably, the platform trailing sides 40 conform with the airfoil pressure sides 30 nearer the leading edges 22 than the trailing edges 24.

As shown in FIG. 3, the fan blades typically include a substantial amount of angular twist B between the roots and tips thereof. The twist angle B is defined between the corresponding chord lines between the tip and root sections, with the airfoil tip 28 at the leading edge 22 preceding the trailing edge 24 in the circumferential rotational direction of the blades. Accordingly, each platform trailing side 40 preferably conforms in profile or axial curvature with the airfoil pressure side 30 near both corresponding airfoil root 26 and leading edge 22.

FIGS. 4 and 5 illustrate an exemplary impact of the trailing side 40 of a liberated platform with the next trailing blade. As shown in FIG. 5, the platform trailing side 40 has a generally convex curvature preselected to generally match or conform with the complementary generally concave curvature of the airfoil pressure side 30 at the expected impact site. As indicated above, the impact occurs relatively close to the airfoil root and primarily near the airfoil leading edge, from the leading edge aft to generally the mid-chord of the airfoil.

FIG. 3 illustrates in more detail the aerodynamic twist of the airfoils which will cause the leading edge region of the airfoil to first impact the liberated platform, with the trailing edge region of the airfoil being inclined away from the direction of rotation. The trailing edge region is thusly less likely to be impacted by the ejected blade, and therefore the aft portion of the platform needs little, if any, conformance in side profile with the receding aft portion of the airfoil pressure side.

Since the fan blades illustrated in FIG. 3 are assembled closely adjacent to each other and include airfoils with relatively high twist, the amount of curvature which may be introduced in the platform trailing sides 40 may be limited by the ability to assemble the individual blades in position between adjacent blades. The profile of the platform trailing sides may therefore have a shallower contour than the corresponding concave contour of the adjoining pressure side for permitting assembly without obstruction or interference by adjoining airfoils.

Once the desired profile of the platform trailing side 40 is selected, the profile of the corresponding platform leading side 38 may then be determined to conform with the platform trailing side 40 of the next adjacent platform for providing a relatively small circumferential gap therebetween for reducing air leakage therethrough during operation. Accordingly, the platform trailing side 40 is configured to conform with the expected impact site on the airfoil pressure side, and then the complementary platform leading side 38 is configured to match the next adjoining platform trailing side.

FIG. 3 illustrates schematically how one of the fan blades 12 may then be assembled between two previously installed fan blades by twisting and radially dropping into position between adjacent platforms. In view of the substantial curvature of the blade platforms, the assembly process may require that the individual blades be dropped radially into position as opposed to axial insertion as commonly found for fan blades.

In the preferred embodiment illustrated in FIG. 1, the disk 14 includes a plurality of axially spaced apart annular rims 44 extending outwardly from a common hub 46.

Correspondingly, each fan blade preferably also includes a plurality of supporting anchor tangs 48 extending radially inwardly from the platform 20 and directly below the corresponding airfoil 18. The axially spaced apart tangs 48 are interdigitated with the corresponding rims 44 and include a common through hole in which a respective retention pin 50 extends axially therethrough for retaining the blade to the supporting rims.

The pin mounting of the individual fan blades may be effected in any conventional manner, with the stacking axis of the airfoil extending radially inwardly through the offset platform and into the corresponding tangs for carrying centrifugal loads into the disk rims 44. This pin mounting arrangement also permits substantial curvature of the platform leading and trailing sides 38,40 without preventing assembly of the individual blades to the disk.

In an alternate embodiment (not shown) in which conventional axial-entry dovetails may be found in the fan blades, the amount of curvature of the platform sides may be limited by the ability to axially engage the dovetails in the corresponding dovetail slots formed in the disk perimeter without obstruction by the arcuate platform sides.

Blade-out testing of the improved fan blade with conforming offset platforms has been conducted in component and full engine tests. As shown in FIGS. 2 and 4, a failure crack 52 was induced in the blade tangs 48 at the corresponding retention pin 50. Liberation of the ejected blade at operational speed resulted in no loss of material from any of the trailing blades notwithstanding platform impact therewith.

Since the improved platform effectively contains blade-out damage to the liberated blade itself without loss of additional material from the impacted trailing blade, the resulting imbalance of the rotor is also limited. Correspondingly, the strength requirement for other rotor and stator components subject to the rotor imbalance loads may be reduced, for reducing the overall weight and complexity of the entire engine. The improved offset conforming platforms thusly enjoy a synergistic benefit beyond their immediate benefit.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A fan blade comprising:
    an airfoil having a root integrally joined to a platform, leading and trailing edges extending from said root to a tip thereof, and opposite first and second sides extending therebetween;
    said platform having forward and aft ends and arcuate first and second sides extending therebetween;
    said airfoil root being laterally offset closer to said platform first side than to said second side; and
    said platform second side conforms with said airfoil first side nearer said leading edge than said trailing edge.

2. A blade according to claim 1 wherein said platform second side conforms with said airfoil first side between said root thereof and a midspan of said airfoil.

3. A blade according to claim 2 wherein said platform second side conforms with said airfoil first side nearer said root than said midspan.

4. A blade according to claim 2 wherein said airfoil first side is concave between said leading and trailing edges, and said platform second side is complementary convex therewith.

5. A blade according to claim 4 wherein said platform second side has a shallower contour than said concave contour of said airfoil first side.

6. A blade according to claim 2 wherein said airfoil twists from said root to tip; and said platform second side conforms with said airfoil first side near both said airfoil root and leading edge.

7. A blade according to claim 2 wherein said platform first side conforms in profile with said platform second side.

8. A blade according to claim 2 further comprising a plurality of support tangs extending from said platform below said airfoil, and having coaxially aligned holes extending therethrough for receiving a retention pin.

9. A blade according to claim 8 in combination with a rotor disk having a plurality of annular rims extending outwardly from a common hub, with said tangs adjoining said rims, and receiving said pin extending axially through said rims for retaining said blade thereon.

10. A fan comprising:
    a plurality of blades extending radially outwardly from a rotor disk; and
    each of said blades including:
        an airfoil having leading and trailing edges extending from root to tip, with opposite first and second sides extending therebetween;
        a platform integrally joined to said airfoil at said root, and having forward and aft ends, and arcuate first and second sides extending therebetween;
        said airfoil root being laterally offset closer to said platform first side than to said second side;
        said platform second side of one of said blades conforms in profile with said airfoil first side of an adjoining one of said blades; and
        said platform second side profiles being shallower in contour than corresponding profiles of adjoining first sides of said airfoils.

11. A fan according to claim 10 wherein said platform second side of one of said blades conforms in profile with said airfoil first side of an adjoining one of said blades nearer said leading edges than said trailing edges.

12. A fan according to claim 11 wherein each of said airfoils twists from said root to tip; and said platform second side conforms with said airfoil first side near both said airfoil root and leading edge.

13. A fan according to claim 12 wherein said airfoil first sides are concave between said leading and trailing edges, and said platform second sides are complementary convex therewith.

14. A fan according to claim 13 wherein said platform first side of said one blade conforms in profile with said platform second side of an opposite adjoining one of said blades.

15. A fan according to claim 14 wherein:
    said disk includes a plurality of annular rims extending outwardly from a common hub;
    each of said blades further includes a plurality of supporting tangs extending from said platform below said corresponding airfoils; and
    respective retention pins extend axially through both said tangs and rims for retaining said blades thereto.

16. A method of reducing damage in a fan during ejection of one of a row of fan blades mounted to a support disk, comprising:
    offsetting airfoils of said blades circumferentially away from respective trailing sides of integral platforms thereof; and
    conforming said platform trailing sides in profile with respective pressure sides of circumferentially trailing ones of said airfoils nearer leading edges of said airfoils than trailing edges thereof for spreading contact loads therebetween during ejection of one of said blades under centrifugal force.

17. A method according to claim 16 further comprising conforming said platform trailing sides with said airfoil pressure sides near respective roots and leading edges thereof.

18. A method according to claim 17 further comprising providing convex curvature in said platform trailing sides to conform with complementary concave curvature of said airfoil pressure sides.

19. A blade according to claim 2 wherein:
    said airfoil twists from said root to tip;
    said airfoil trailing edge is inclined away from said platform first side toward said platform second side between said root and tip; and
    said platform second side is convex closer to said airfoil leading edge than to said airfoil trailing edge.

20. A blade according to claim 19 wherein said platform first and second sides are substantially straight between said trailing edge of said airfoil and a mid-chord thereof.

* * * * *